3,329,742
LUBRICATING OILS CONTAINING PHOSPHORUS
PRODUCTS
Herbert Myers, Cherry Hill, N.J., assignor to Mobil Oil
Corporation, a corporation of Delaware
No Drawing. Filed Oct. 15, 1965, Ser. No. 496,698
13 Claims. (Cl. 260—976)

This application is a continuation-in-part of my copending application Ser. No. 429,143, filed Jan. 29, 1965, now abandoned.

This invention relates to a method of preparing aromatic phosphonates and in particular it relates to a one-step method for preparing diaryl hydrogen phosphonates and to lubricating oil compositions containing the same.

Organophosphorus compounds have found increased utility in the fields of insecticides, as stabilizers for synthetic fluids and resins, and in lubricating oils. Because these compounds are growing in commercial interest the methods of preparing them must be made more economically feasible.

Various preparations of organic hydrogen phosphonates have been described in the past. However, these prior procedures, particularly in the preparation of aromatic hydrogen phosphonates, have involved either arduous laboratory procedures requiring many steps or else reactions resulting in extremely low yields or the formation of high molecular weight by-products which are difficult to remove. Such procedures are obviously inadequate for the preparation of aromatic hydrogen phosphonates on a commercial basis. For example, one known procedure involves reaction between triaryl phosphites and phosphorous acid. This method is not easily adapted to commercial production in view of both the difficulties of obtaining anhydrous phosphorous acid and the high cost.

Therefore, it is an object of this invention to provide a convenient method of preparing aromatic hydrogen phosphonates. Another object is to provide a commercial process for preparing diaryl hydrogen phosphonates by a one-step method. A further object is to provide high molecular weight diaryl hydrogen phosphonates.

The aforementioned and other objects I achieve by reacting a phenol, an aliphatic alcohol or water and phosphorus trichloride. The amounts of each reactant are preferably stoichiometric, so that the mole ratio of phenol to the alcohol or water and to the phosphorus trichloride is about 2:1:1.

The following reaction may further illustrate the process of this invention:

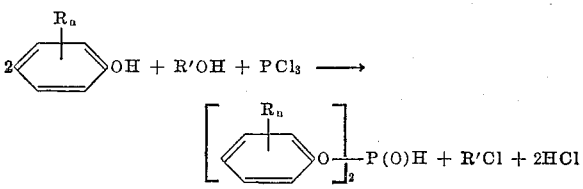

wherein R may be an alkyl radical having from 1 to 12 carbon atoms or halo, haloalkyl, alkoxy, aryl and alkaryl, R′ is hydrogen or an alkyl radical having from 1 to 18 carbon atoms and includes straight chain, branch chain and cyclic radicals, and $n$ is an integer of 0 to 5.

The reaction upon which the method of this invention is based requires the initial mixing of the phenol and the alcohol or water in the reactor. While these two reactants are being mixed, phosphorus trichloride is added slowly, drop-wise, if necessary, to control the temperature. External cooling may be applied thus enabling more rapid feed rate to be used. I prefer to conduct the reaction at a temperature in the range of about 25° to 100° C., and preferably in the range of 40° to 70° C. Therefore, in the initial stages of the reaction, cooling means is required. In the latter stages of the reaction, the temperature may be allowed to be increased to the upper portion of the temperature range. Since the reaction is exothermic, the reaction is deemed complete when no heat in involved. The final porduct is recovered by simply removing the halide by-product by distillation either at atmospheric or reduced pressure.

The reaction takes place in a liquid phase. Since the reactants are liquid, solvents are not required. However, if desired for the purpose of better controlling the reaction conditions, liquid hydrocarbons, chlorinated hydrocarbons, and ethers which are inert to the reactants may be added. These include heptane, isooctance, benzene, toluene, chlorobenzene, and the like.

The phenols which are suitable for the process of this invention include phenol, alkylphenols, such as cresol, nonylphenol, halophenols, such as chlorophenol, and alkoxyphenols, such as methoxyphenol. The alkyl substituents on the aromatic nucleus may have from 1 to 12 carbon atoms. The alcohols which may be used in the reaction process include all of the alkanols having from 1 to 18 carbon atoms, including methanol and decanol, the branched isomers thereof and cyclo-alkanols, such as cyclohexanol. I find it preferable to use primary alcohols, especially the short-chained alcohols, when the phenol to be reacted is the unsubstituted phenol, and the tertiary alcohols when substituted phenols are to be reacted. By following this mode, improved conversion rates and high yields of products may be obtained. Excellent yields are also obtained by employing water as the reactant. Because of lower cost and availability, water is one of the preferred reactants according to this invention.

The products prepared according to the methods described in this invention are excellent antioxidants in lubricating compositions, as well as for use in other earlier described functions. Because of their effectiveness in preventing acid formation of oils during use, only a small amount need be introduced into lubricant blends. Ordinarily, it is preferred to add from 0.05% to about 20% by weight of the phosphonate compound.

The phenol reactant of particular interest, according to this invention, is nonylphenol for preparing dinonylphenol hydrogen phosphonate. The preferred amounts of dinonylphenol hydrogen phosphonate in the lubricating oils is in the range of about 0.10% to 10% by weight. This novel phosphonate provides antioxidant properties and extreme pressure strength for lubricating oils and hydrocarbon type fuels.

The following specific examples are designed to illustrate the means of carrying out this invention without intending to impose a limitation thereon. Any mention of parts or percent is deemed to be by weight unless otherwise indicated.

Example 1

Into a flask fitted with a stirrer, condenser, thermometer and drop funnel were added 188 grams (2 moles) of phenol and 32 grams (1 mole) of methanol. The contents were mixed with the stirrer and 138 grams (1 mole) of phosphorus trichloride were added drop-wise over 1½ hours. The temperature during this addition was maintained at 25° to 30° C. After all of the phosphorus trichloride had been added, the reaction mixture was stirred for an additional 20 hours at 25° C. and 2 hours thereafter at 60° to 70° C. The resulting reaction mixture was topped to a pot temperature of 125° C. at 0.7 mm. Hg. The remaining pale yellow, liquid product was filtered through diatomaceous earth to yield 235 grams (100% of theory) of a product having the following analysis:

*Analysis.*—Calc'd for $(C_6H_5O)_2P(O)H$: Percent P, 13.4; percent Cl, nil. Found: Percent P, 13.1; Cl, 0.05.

Infrared absorption spectra indicates a presence of phosphorus-hydrogen bonds, at 4.1 microns, and phosphorus-oxygen double bonds, at 7.9 microns.

EXAMPLE 2

Using the same reactor as in Example 1, 2 moles of phenol and 1 mole of propanol-1 were mixed together. While the additives were being stirred, 1 mole of phosphorus trichloride was added drop-wise over a 2-hour period with the temperature maintained between 45° and 55° C. When the phosphorus trichloride addition was complete the reaction mixture was stirred at a temperature of 50° to 55° C. for an additional 6¼ hours. Finally the reaction mixture was topped to a pot temperature of 150° C. and a vapor temperature of 110° C. at 0.05 mm. The remaining colorless liquid was filtered through diatomaceous earth leaving 227 grams (97% of theory) of product.

*Analysis.*—Calc'd for $(C_6H_5O)_2P(O)H$: Percent P, 13.4; percent Cl, nil. Found: Percent P, 13.0; percent Cl, less than 0.01.

EXAMPLE 3

Using the procedures and equipment as in Example 1, 2 moles of phenol were separately mixed with 1 mole each of (a) butanol-1, (b) butanol-2 and (c) tertiarybutanol. Phosphorus trichloride was added drop-wise to each mixture with agitation while maintaining the temperature in the range of 45° to 55° C. A butyl chloride isomer product was removed in each case with pot temperatures in the range of 140° to 145° C. at 100 mm. Hg. The yield of liquid product varied between 88% to 92%.

EXAMPLE 4

Using the same procedures and equipment as in the above examples, 2 moles of phenol and 1 mole of the decanol-1 were reacted with 1 mole of the phosphorus trichloride at 60° C. for 5½ hours. The reaction mixture was subjected to fractional distillation at 0.05 mm. Hg yielding 234 grams of residue. Results of the fractions are tabulated below:

| Fraction | Pot Temp., °C. | Vap Temp., °C. | Weight, gm. | Percent Cl | Percent |
|---|---|---|---|---|---|
| 1 | 73–76 | 50–65 | 7 | 17.9 | nil |
| 2 | 76–97 | 65–80 | 104 | 17.7 | nil |
| 3 | 97–141 | 80–85 | 46 | 14.8 | 0.4 |
| 4 | 141–152 | 85–125 | 7 | 0.9 | 4.1 |
| Residue | | | 234 | 0.1 | 12.4 |

Yields and analyses of fractions 1, 2 and 3 indicate approximately a 70% to 75% conversion of decanol-1 to 1-chlorodecane.

EXAMPLE 5

Using the procedures and equipment of the above examples, 2 moles of orthocresol and 1 mole of butanol-1 were reacted with 1 mole of phosphorus trichloride. The reaction mixture was topped to a pot temperature of 140° C. at 100 mm. giving 81 grams (88% of theory) of a light distillate and 266 grams (102% of theory) of a liquid residue. The residue was further topped to 140° C. at 0.05 mm. Hg (the vapor temperature was 115° C.) yielding 251 grams (97% of theory) of an amber liquid product.

*Analysis.*—Calc'd for $(C_7H_7O)_2P(O)H$: Percent P, 11.8; percent Cl., nil. Found: Percent P, 11.5; percent Cl, less than 0.01.

EXAMPLE 6

Using the procedure and equipment as in the above examples, 2 moles of 4-nonylphenol and 1 mole of butanol-1 were reacted with 1 mole of phosphorus trichloride. The reaction mixture was distilled to remove the butyl chloride yielding 522 grams (104% of theory) of a pale yellow viscous product.

*Analysis.*—Calc'd for $(C_{15}H_{23}O)_2P(O)H$: Percent P, 6.4; percent Cl, nil. Found: Percent P, 5.8; percent Cl, less than 0.05.

The above example was repeated with tertiary butanol instead of butanol-1, yielding 505 grams (100% of theory) of product. (Found: Percent P, 6.1; percent Cl, 0.1.)

EXAMPLE 7

Using the procedure and equipment of the above examples, 2 moles of 4-methoxyphenol and 1 mole of butanol-1 were reacted with 1 mole of phosphorus trichloride. Butyl chloride by-product was removed leaving 297 grams (101% of theory) of a pale amber residue.

*Analysis.*—Calc'd for $(C_7H_7O_2)_2P(O)H$: Percent P, 10.5; percent Cl, nil. Found: Percent P, 10.4; percent Cl, 0.05.

EXAMPLE 8

Using the procedure and equipment of the above examples, 2 moles of 4-chlorophenol and 1 mole of butanol-1 were reacted with 1 mole of phosphorus trichloride. The reaction mixture was subjected to vacuum distillation yielding 317 grams (105% of theory) of a pale yellow product.

*Analysis.*—Calc'd for $(ClC_6H_4O)_2P(O)H$: Percent P, 10.2; percent Cl, 23.4. Found: Percent P, 9.5; percent Cl, 22.3.

The above procedure was repeated using tertiarybutanol instead of butanol-1. After the distillation step, 282 grams (93% of theory) of the above product was obtained.

*Analysis.*—Calc'd for $(ClC_6H_4O)_2P(O)H$: Percent P, 10.2; percent Cl, 23.2. Found. Percent P, 10.4; percent Cl, 22.4.

EXAMPLE 9

Using the procedures and equipment of the above examples, 2 moles of nonylphenol and 1 mole of water were reacted with 1 mole of phosphorus trichloride, added over a 20-minute period, at 40° to 45° C. After the phosphorus trichloride addition was complete, the reaction mixture was stirred for an additional 6¼ hours at 60° to 75° C. The product yield was 487 grams (100% of theory) of a light yellow viscous product.

*Analysis.*—Calc'd for $(C_{15}H_{23}O)_2P(O)H$: Percent P, 6.4; percent Cl, nil. Found: Percent P, 6.3; percent Cl, 0.1.

Evaluation of products

The diaryl hydrogen phosphonate prepared according to the method of this invention have a variety of useful functions. Among the more important uses is the ability of these compounds to prevent the increasing acidity of lubricating oils in an oxidizing medium, particularly in the presence of catalytic metals.

In the test to indicate antioxidant properties, the product is added to a mineral lubricating oil. This oil composition is heated to 325° F. and dry air at the rate of 10 liters per hour is passed through it in the presence of iron, copper, aluminum and lead. After 24 hours the neutralization number for the oil composition is obtained using ASTM D–974–1. The additive is rated in terms of concentration of phosphorus required to keep the increase in neutralization number below 2. Additives which can accomplish this at concentrations of less than 0.1% phosphorus are of primary interest. In this test, the base oil was an SAE 10 solvent-defined mid-continent oil.

The following table indicates the additive identified by the example numbers and corresponding percent phosphorus required to keep the acidity level acceptable.

| Example: | Minimum percent phosphorus |
|---|---|
| 2 | 0.052 |
| 3C | 0.040 |
| 7 | 0.030 |

As mentioned heretofore, dinonylphenyl hydrogen phosphonate (DNHP) possesses excellent extreme pressure characteristics. This substance was added to a lubricating oil composition prepared for jet engines. The oil contained various other additives such as detergents, anticorrosive agents, viscosity controlling agents and the like. These blends were tested on the Ryder Gear rig.

The Ryder Gear test determines the load-carrying ability of aircraft turbine engine lubricants. The lubricant composition sample is subjected to a standard test machine which contains a pair of spur gears; the machine is operated at increasing gear tooth loads of 5 pound increments. After each loading, one of the test gears is examined to determine the scuffed area on each tooth. The load at which an average 22½% of the total contact tooth area is scuffed or abraded is the scuff load or reported load and indicates the load-carrying ability of the lubricant.

The conditions of the test are as follows:

| | |
|---|---|
| Gear speed, r.p.m. | 10,000±100 |
| Oil temperature in ° F. | 165±5 |
| Oil flow rate, cc./min. | 270±5 |

The results of this test are as follows:

| | Lbs. |
|---|---|
| Oil alone | 2581 |
| Oil plus 0.37% by weight of DNHP | 3116 |
| Oil plus 0.75% by weight of DNHP | 3195 |

The above base oil and the 0.75% blend were compared in the well-known four-ball extreme pressure test.

In the four-ball test, three one-half inch 52–100 tool-steel balls are clamped in a stationary ball cup. A fourth ball is held in a rotatable chuck at the vertical end of a spindle and is rotated against the three stationary balls; the test composition is used as the lubricant. A series of runs are usually made at varying conditions. The average diameter of the resulting weld scars appearing on the balls is reported (in inches). In this instance, the test was run at 167° F. and 1800 r.p.m. under loads of 10 kg. (1) and 40 kg. (2); and at 400° F. and 600 r.p.m. under a load of 10 kg. (3). The following results were obtained:

| Test No. | Base Oil Alone | Base Oil With 0.75% DNHP |
|---|---|---|
| (1) | 0.570 | 0.267 |
| (2) | 0.777 | 0.462 |
| (3) | 0.687 | 0.275 |

The above results show that the phosphonates prepared by the method of this invention have strong antioxidant properties for use in lubricating oil and, the nonylphenyl derivative is particularly outstanding as a load-carrying agent and anti-wear agent at both low and high temperature oils. Furthermore, these diaryl hydrogen phosphonates are compatible with other oil additives, such as pour point depressors, index improvers, viscosity controlling agents, detergents, corrosive inhibitors and the like. The foregoing description thus illustrates that my process may be easily and conveniently utilized in the production of valuable products.

The hereinabove disclosure is intended to be illustrative only of my invention and I do not intend to be limited thereby except as limiting the following claims.

I claim:

1. A method of preparing diaryl hydrogen phosphonates by reacting together (a) a phenol, (b) a member of the group consisting of an alcohol and water, and (c) phosphorus trichloride in a mole ratio of 2:1:1.

2. A method of preparing diaryl hydrogen phosphonates by reacting together (a) a phenol having a structure

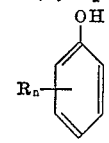

wherein R is selected from the group consisting of halo, alkyl, haloalkyl, alkoxy, aryl and alkaryl, the alkyl substituents having from 1 to 12 carbon atoms, and $n$ is an integer of from 0 to 5, (b) a member of the group consisting of an alcohol and water, and (c) phosphorus trichloride in a mole ratio of 2:1:1.

3. The method of claim 2 wherein reactant (b) is water.

4. The method of claim 2, wherein reactant (b) is an alcohol containing from 1 to 18 carbon atoms.

5. A method of preparing diaryl hydrogen phosphonates by reacting together (a) an alkyl phenol having from 1 to 12 carbon atoms in the alkyl substituent, a member of the group consisting of an alcohol and water, and phosphorus trichloride in a mole ratio of 2:1:1.

6. A method of preparing diaryl hydrogen phosphonates by reacting together (a) a phenol, (b) a member of the group consisting of an alcohol and water and (c) phosphorus trichloride in a mole ratio of 2:1:1 wherein the phenol is selected from the group consisting of phenol, cresol, nonylphenol, methoxyphenol and chlorophenol.

7. A method of preparing diaryl hydrogen phosphonates by reacting together (a) a phenol, (b) a member of the group consisting of an alcohol and water and (c) phosphorus trichloride at a temperature in the range of about 25° to 100° C. in a mole ratio of 2:1:1.

8. A method of preparing diphenyl hydrogen phosphonate by the step of adding phosphorus trichloride to a mixture of phenol and a member of the group consisting of an alcohol and water having from 1 to 18 carbon atoms, at a temperature in the range of 40° to 70° C., whereby the mole ratio of the total reactants is 1:2:1 of said phosphorus trichloride, phenol, and alcohol, respectively.

9. The method of claim 8, wherein the alcohol is selected from the group consisting of butanol-1, butanol-2, and tert.-butanol.

10. The method of claim 8, wherein the alcohol is decanol-1.

11. A method of preparing dinonylphenol hydrogen phosphonate by the steps of adding phosphorus trichloride to a mixture of nonylphenol and a member of the group consisting of an alcohol and water having from 1 to 18 carbon atoms and removing the chloride by-product wherein the mole ratio of phosporus trichloride to nonylphenol to said member is 1:2:1.

12. The method of claim 11 wherein the said member is water.

13. The method of claim 11, wherein the said member is butanol-1.

(References on following page)

References Cited

UNITED STATES PATENTS

| | | | |
|---|---|---|---|
| 2,408,744 | 10/1946 | Engell | 260—976 |
| 2,732,365 | 1/1956 | Bill et al. | 260—45.7 |
| 2,915,496 | 12/1959 | Swart et al. | 260—45.7 |
| 3,088,917 | 5/1963 | Friedman | 260—49.8 X |
| 3,115,465 | 12/1963 | Orloff et al. | 260—49.8 X |

FOREIGN PATENTS

| | | |
|---|---|---|
| 730,957 | 6/1955 | Great Britain. |

OTHER REFERENCES

Anschutz et al., "Naturwissenschaften," vol. 42 (1955), page 644.

Davey, "Industrial and Eng. Chem.," vol. 42 (1950), pages 1841–1847.

DANIEL E. WYMAN, *Primary Examiner.*

W. H. CANNON, *Assistant Examiner.*